United States Patent
Nishio et al.

(10) Patent No.: US 12,315,472 B2
(45) Date of Patent: May 27, 2025

(54) INFORMATION PROCESSING APPARATUS AND CONTROL METHOD

(71) Applicant: Lenovo (Singapore) Pte. Ltd., Singapore (SG)

(72) Inventors: Masashi Nishio, Kanagawa (JP); Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/406,486

(22) Filed: Jan. 8, 2024

(65) Prior Publication Data

US 2024/0296814 A1  Sep. 5, 2024

(30) Foreign Application Priority Data

Mar. 3, 2023  (JP) .................................. 2023-032415

(51) Int. Cl.
*G09G 5/10* (2006.01)
*G06F 1/3231* (2019.01)
*G06F 3/01* (2006.01)
*G09G 3/20* (2006.01)

(52) U.S. Cl.
CPC ............. *G09G 5/10* (2013.01); *G06F 3/012* (2013.01); *G09G 3/2096* (2013.01); *G06F 1/3231* (2013.01); *G09G 2320/0626* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 6,665,805 B1* | 12/2003 | Tsirkel | G09G 3/20 713/323 |
| 8,913,004 B1* | 12/2014 | Bozarth | G06F 1/3234 348/78 |
| 2004/0008176 A1* | 1/2004 | Nuimura | G09G 3/3406 345/102 |

(Continued)

FOREIGN PATENT DOCUMENTS

| | | |
|---|---|---|
| JP | 2014-27386 A | 2/2014 |
| JP | 2014-142851 A | 8/2014 |

(Continued)

*Primary Examiner* — Dorothy Harris
(74) *Attorney, Agent, or Firm* — Osha Bergman Watanabe & Burton LLP

(57) ABSTRACT

An information processing apparatus includes: a memory; a processor; a display unit which displays a display image based on the processing executed by the processor; a first sensor for detecting a person present in a predetermined detection range or an orientation of a face of the person; and a second sensor which detects an ambient brightness, wherein the processor performs first brightness changing processing to change the screen brightness of the display unit from a current brightness value based on the detection result using the first sensor, second brightness changing processing to change the screen brightness from the current brightness value based on the detection result using the second sensor, and brightness changing control processing to control whether or not to change the screen brightness by the second brightness changing processing based on the detection result using the first sensor.

6 Claims, 6 Drawing Sheets

| SCREEN BRIGHTNESS | 100 | 20 | 20 | 130 | 100 |
|---|---|---|---|---|---|
| HPD BRIGHTNESS CHANGING PROCESSING | – | REDUCE TO 20% | – | RESTORE SCREEN BRIGHTNESS TO 100 | – |
| ALS BRIGHTNESS CHANGING PROCESSING | – | HOLD (FIX) ALS OUTPUT VALUE | | +30 | –30 |

(56) References Cited

U.S. PATENT DOCUMENTS

| | | | | |
|---|---|---|---|---|
| 2005/0057484 | A1* | 3/2005 | Diefenbaugh | G09G 3/3406 345/102 |
| 2008/0006762 | A1* | 1/2008 | Fadell | G06F 3/0383 250/201.1 |
| 2009/0207121 | A1* | 8/2009 | Shih | H04W 52/027 345/102 |
| 2010/0149227 | A1* | 6/2010 | Tomizawa | G09G 3/3648 345/694 |
| 2011/0115766 | A1* | 5/2011 | Kerofsky | H04N 21/44218 345/212 |
| 2011/0135114 | A1* | 6/2011 | Oba | H04N 21/4415 381/107 |
| 2011/0305375 | A1* | 12/2011 | Nelson | G06F 3/005 382/118 |
| 2012/0019447 | A1* | 1/2012 | Hanes | G09G 5/00 345/589 |
| 2015/0145883 | A1* | 5/2015 | Marti | G06T 11/001 345/592 |
| 2016/0104454 | A1* | 4/2016 | Huang | G06F 3/04847 345/156 |
| 2017/0010654 | A1* | 1/2017 | Chen | G06F 1/3265 |
| 2017/0329399 | A1* | 11/2017 | Azam | G06F 3/04842 |
| 2017/0337895 | A1* | 11/2017 | Kosugi | G06F 1/206 |
| 2017/0345393 | A1* | 11/2017 | Wu | G06F 3/012 |
| 2018/0129262 | A1* | 5/2018 | Veiga | G06F 3/0488 |
| 2020/0058256 | A1* | 2/2020 | Seibert | G06F 3/017 |
| 2020/0211499 | A1* | 7/2020 | Sun | G06F 3/147 |
| 2020/0363857 | A1* | 11/2020 | Kosugi | G06F 1/324 |
| 2021/0109213 | A1* | 4/2021 | Hamlin | G01S 7/4868 |
| 2022/0147142 | A1* | 5/2022 | Bui | G06F 1/3287 |
| 2022/0382359 | A1* | 12/2022 | Kosugi | G06F 1/3231 |
| 2023/0176897 | A1* | 6/2023 | Kosugi | G06V 40/161 |
| 2023/0205858 | A1* | 6/2023 | Kosugi | G06T 7/62 382/118 |
| 2023/0260243 | A1* | 8/2023 | Kashiyama | H04N 23/11 348/370 |
| 2023/0289484 | A1* | 9/2023 | Nishio | G06F 21/31 |
| 2024/0013571 | A1* | 1/2024 | Kosugi | G06F 21/32 |

FOREIGN PATENT DOCUMENTS

| | | |
|---|---|---|
| JP | 2016-517087 A | 6/2016 |
| JP | 2016-148895 A | 8/2016 |
| JP | 2017-175525 A | 9/2017 |
| WO | 2014/151277 A1 | 9/2014 |

* cited by examiner

FIG. 4A

| | (1) | (2) | (3) | (4) | (5) |
|---|---|---|---|---|---|
| AMBIENT BRIGHTNESS | INSIDE TUNNEL (DARK) | | OUTSIDE TUNNEL (BRIGHT) | | INSIDE TUNNEL (DARK) |
| FACE ORIENTATION | FORWARD | SIDEWAYS | | FORWARD | |
| SCREEN BRIGHTNESS | 100 | 20 | 50 | 100 | 70 |
| HPD BRIGHTNESS CHANGING PROCESSING | – | REDUCE TO 20% | – | RESTORE SCREEN BRIGHTNESS TO 100 | – |
| ALS BRIGHTNESS CHANGING PROCESSING | – | – | +30 | – | –30 |

FIG. 4B

| | (1) | (2) | (3) | (4) | (5) |
|---|---|---|---|---|---|
| SCREEN BRIGHTNESS | 100 | 20 | 20 | 130 | 100 |
| HPD BRIGHTNESS CHANGING PROCESSING | – | REDUCE TO 20% | – | RESTORE SCREEN BRIGHTNESS TO 100 | – |
| ALS BRIGHTNESS CHANGING PROCESSING | – | HOLD (FIX) ALS OUTPUT VALUE | | +30 | –30 |

INFORMATION PROCESSING APPARATUS AND CONTROL METHOD

CROSS-REFERENCE TO RELATED APPLICATIONS

This application claims priority to Japanese Patent Application No. 2023-032415 filed on Mar. 3, 2023, the contents of which are hereby incorporated herein by reference in their entirety.

BACKGROUND

Technical Field

The present invention relates to an information processing apparatus and a control method.

Description of Related Art

In recent years, a function to reduce power by adjusting the brightness of a display unit (display) has been attracting attention due to expectations for ESG (Environment, Social, Governance). For example, there is an information processing apparatus such as a personal computer to reduce the brightness of the display unit when a person has moved away or when a person is facing sideways even in a case where the person is present, and then perform control to turn off the display and cause the system to make a transition to a standby state.

For example, in Japanese Unexamined Patent Application Publication No. 2016-148895, there is disclosed an apparatus which detects that a person has approached or has moved away using an infrared sensor to make a transition to a usable state when detecting that the person has approached or to a state with reduced power consumption when detecting that the person has moved away. Further, in recent years, with the development of computer vision and the like, detection accuracy when detecting a face from an image has been getting higher. Therefore, person detection by face detection is also performed instead of person detection by the infrared sensor. In the person detection by face detection, since the orientation of a face can be detected in addition to simply detecting a person, it is used to control the brightness of a display unit according to the orientation of the face as described above.

In the meantime, there has been conventionally a function to control the screen brightness depending on the ambient brightness. It is also considered to have both a function to control the screen brightness depending on this brightness and a function to control the screen brightness using the detection result of the person or the orientation of the face described above. However, when processes to perform respective screen brightness controls operate separately to change the screen brightness, since both processes do not understand each other's controls to change the screen brightness, the screen brightness may not be able to be controlled because of a discrepancy therebetween.

SUMMARY

The present invention has been made in view of the above circumstances, and it is an object thereof to provide an information processing apparatus and a control method capable of controlling the screen brightness of a display unit properly.

The present invention has been made to solve the above problem, and an information processing apparatus according to the first aspect of the present invention includes: a memory which temporarily stores programs of a system and programs executed on the system; a processor which executes processing based on the programs stored in the memory; a display unit which displays a display image based on the processing executed by the processor; a first sensor which detects a person present in a predetermined detection range or the orientation of a face of the person; and a second sensor which detects the ambient brightness, wherein the processor performs first brightness changing processing to change the screen brightness of the display unit from a current brightness value based on the detection result using the first sensor, second brightness changing processing to change the screen brightness from the current brightness value based on the detection result using the second sensor, and brightness changing control processing to control whether or not to change the screen brightness by the second brightness changing processing based on the detection result using the first sensor.

The above information processing apparatus may be such that when it is detected that no person is present in the predetermined detection range or that a face of a person present in the predetermined detection range is not facing a direction of the display unit based on the detection result using the first sensor, the processor performs control not to change the screen brightness by the second brightness changing processing in the brightness changing control processing.

The above information processing apparatus may also be such that in the second brightness changing processing, the processor changes the screen brightness from the current brightness value based on an output value output from the second sensor depending on the ambient brightness, and in the brightness changing control processing, when performing control not to change the screen brightness by the second brightness changing processing, the processor fixes the output value of the second sensor.

The above information processing apparatus may further be such that, in a state where the processing using the first sensor to detect whether or not a person is present in the predetermined detection range or to detect the orientation of a face of the person present in the predetermined detection range is not executed, the processor sets an output value according to the ambient brightness without fixing the output value of the second sensor in the brightness changing control processing.

Further, the above information processing apparatus may be such that, in a state where at least either one of the first brightness changing processing and the second brightness changing processing is not executed, the processor sets an output value according to the ambient brightness without fixing the output value of the second sensor in the brightness changing control processing.

Further, the above information processing apparatus may be such that, when changing the screen brightness from the current brightness value in the second brightness changing processing, the processor increases or decreases the screen brightness from the current brightness value based on the detection result using the second sensor.

Further, the above information processing apparatus may be such that, in the first brightness changing processing, the processor changes the screen brightness from the current brightness value and stores, in the storage unit, the brightness value before change as a result of detecting that no person is present in the predetermined detection range or that a face of a person present in the predetermined detection range is not facing the direction of the display unit based on the detection result using the first sensor, and the processor restores the screen brightness to the brightness value before change stored in the storage unit as a result of detecting that a person is present from a state where no person is present in the predetermined detection range or that a face of a person not facing the direction of the display unit turned in the direction of the display unit based on the detection result using the first sensor.

Further, a control method according to the second aspect of the present invention is a control method for an information processing apparatus including: a memory which temporarily stores programs of a system and programs executed on the system; a processor which executes processing based on the programs stored in the memory; a display unit which displays a display image based on the processing executed by the processor; a first sensor which detects a person present in a predetermined detection range or an orientation of a face of the person; and a second sensor which detects an ambient brightness, the control method including: a first brightness changing step of causing the processor to change a screen brightness of the display unit from a current brightness value based on the detection result using the first sensor; a second brightness changing step of causing the processor to change the screen brightness from the current brightness value based on the detection result using the second sensor; and a brightness changing control step of causing the processor to control whether or not to change the screen brightness by the second brightness changing step based on the detection result using the first sensor.

The above aspects of the present invention can properly control the screen brightness of the display unit.

BRIEF DESCRIPTION OF THE DRAWINGS

FIGS. 4A-4B are explanatory diagrams of an example of screen brightness control according to the embodiment.

DETAILED DESCRIPTION

An embodiment of the present invention will be described below with reference to the accompanying drawings.

Overview

First, the overview of an information processing apparatus according to the embodiment will be described.

Figure 1:
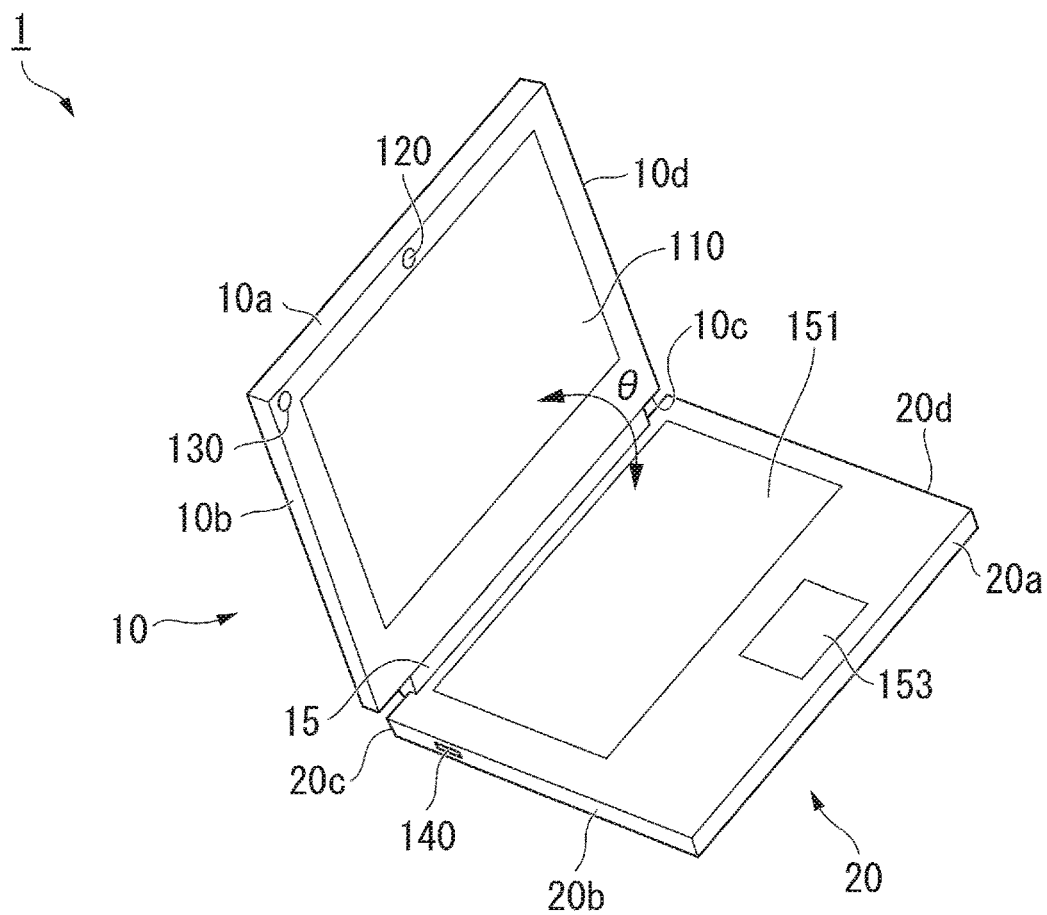
FIG. 1 is a perspective view illustrating a configuration example of the appearance of an information processing apparatus according to an embodiment.

FIG. 1 is a perspective view illustrating a configuration example of the appearance of an information processing apparatus 1 according to the present embodiment.

The information processing apparatus 1 is, for example, a laptop (clamshell) PC (Personal Computer). The information processing apparatus 1 includes a first chassis 10, a second chassis 20, and a hinge mechanism 15. The first chassis 10 and the second chassis 20 are joined by using the hinge mechanism 15. The first chassis 10 is rotatable around the rotation axis of the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 and an ambient light sensor 130 are provided in peripheral areas of the display unit 110 on the inner face of the first chassis 10. Note that the illustrated position of the imaging unit 120 is just an example, and it may be elsewhere as long as the imaging unit 120 can be directed in a direction facing a display screen of the display unit 110. Further, the illustrated position of the ambient light sensor 130 is just an example, and it may be elsewhere as long as the ambient light sensor 130 can detect the ambient brightness of the information processing apparatus 1. For example, the ambient light sensor 130 may be placed in any position on the inner face of the first chassis 10 and the inner face of the second chassis 20.

In the open state, the imaging unit 120 images a predetermined imaging range in the direction facing the display screen of the display unit 110 (that is, in front of the information processing apparatus 1). The predetermined imaging range is an angle-of-view range defined by an image sensor included in the imaging unit 120 and an optical lens provided in front of the imaging surface of the image sensor. For example, the imaging unit 120 can capture an image including a person (user) present in front of the information processing apparatus 1.

The ambient light sensor 130 (ALS) is a sensor to detect an ambient brightness (for example, illuminance) around the information processing apparatus 1. The ambient light sensor 130 senses and photoelectrically converts the amount of ambient light, and outputs a photoelectrically converted value as an output value. For example, the ambient light sensor 130 is configured to include a phototransistor. The ambient light sensor 130 converts a current flowing through the phototransistor into a voltage using a resistor, and outputs the voltage as a voltage value.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification.

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display screen of the display unit 110 may be constructed as a touch panel to accept operations. Further, a microphone used to input voice may be included in the input device.

Note that, in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, and put in a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
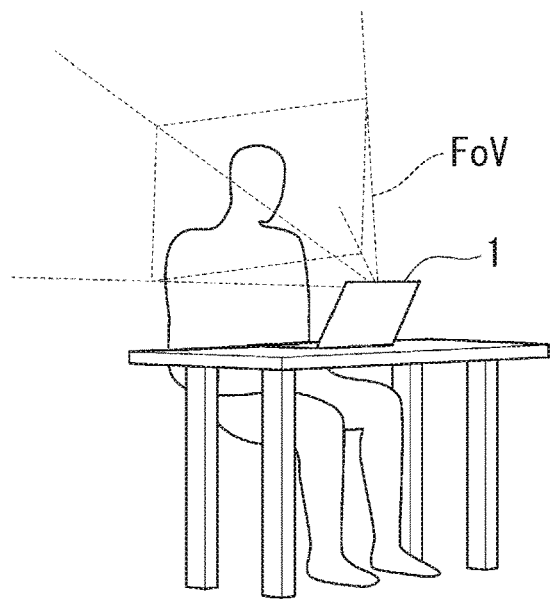
FIG. 2 is a diagram illustrating an example of a person detection range of the information processing apparatus according to the embodiment.

FIG. 2 is a diagram illustrating an example of a person detection range of the information processing apparatus 1 according to the present embodiment. In the illustrated example, a detection range FoV (Field of View: detection viewing angle) in front of the information processing apparatus 1 is a person-detectable range.

For example, the information processing apparatus 1 detects a face area with a face captured therein from the captured image captured by the imaging unit 120 to determine whether or not a person (user) is present in front of the information processing apparatus 1. The detection range FoV corresponds to the imaging angle of view of the information processing apparatus 1. When the face area is detected from the captured image, the information processing apparatus 1 determines that the person is present. On the other hand, when no face area is detected from the captured image, the information processing apparatus 1 determines that no person is present.

The information processing apparatus 1 controls the operating state of the system of the information processing apparatus 1 depending on the presence or absence of a person by HPD processing. For example, when a person is present in front of the information processing apparatus 1, the information processing apparatus 1 controls the operating state to the normal operating state, while when no person is present in front of the information processing apparatus 1, the information processing apparatus 1 controls the operating state to the standby state.

Figure 3A:
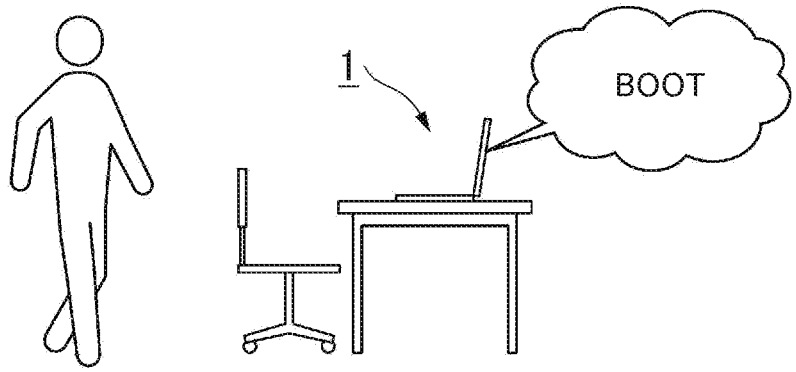
FIGS. 3A-3C are diagrams for describing an overview of HPD processing of the information processing apparatus according to the embodiment.
Figure 3B:
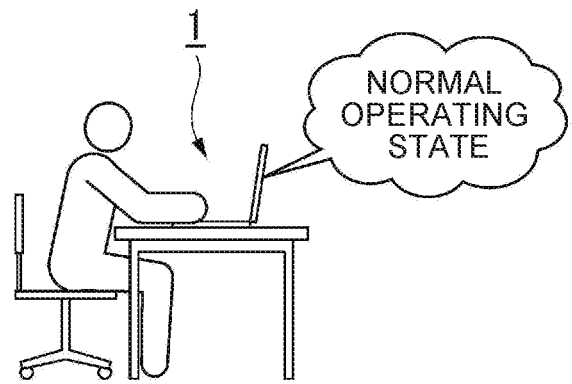
Figure 3C:
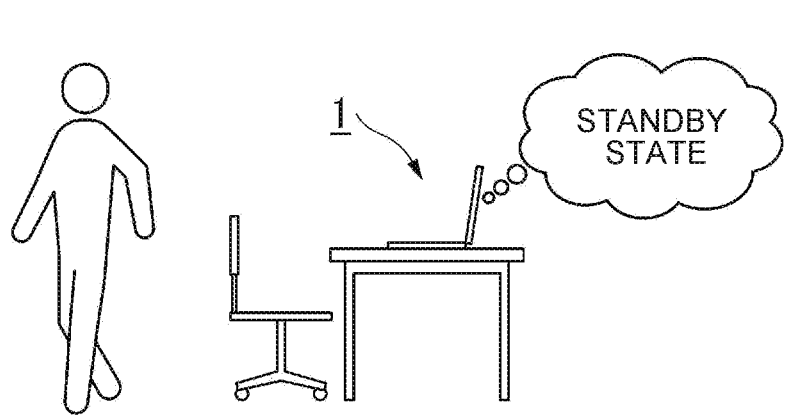

FIGS. 3A-3C are diagrams for describing the overview of HPD processing of the information processing apparatus 1 according to the present embodiment. The information processing apparatus 1 detects a person present in front of the information processing apparatus 1 by the HPD processing, and controls the operating state of the system of the information processing apparatus 1 depending on the presence or absence of a person. For example, in the standby state as illustrated in FIG. 3A, when detecting a change from a state where no person is present in front of the information processing apparatus 1 (Absence) to a state where a person is present (Presence), that is, when detecting that a person has approached the information processing apparatus 1 (Approach), the information processing apparatus 1 automatically boots the system to make the transition to the normal operating state. Further, in a state where a person is present in front of the information processing apparatus 1 (Presence) in the normal operating state as illustrated in FIG. 3B, the information processing apparatus 1 continues the normal operating state. Further, as illustrated in FIG. 3C, when detecting a change from the state where the person is present in front of the information processing apparatus 1 (Presence) to a state where no person is present (Absence), that is, when detecting that the person has left the information processing apparatus 1 (Leave), the information processing apparatus 1 causes the system to make the transition to the standby state.

Further, when a person is present in front of the information processing apparatus 1, the information processing apparatus 1 detects the orientation of a face of the person. Here, the orientation of a face is an orientation corresponding to a rotation angle in the left and right direction and an orientation corresponding to a rotation angle in the vertical direction. In the following, it is assumed that a state where the face is facing the direction of the information processing apparatus 1 (the direction of the display unit 110 and the imaging unit 120) is a state where the face is facing forward. For example, the information processing apparatus 1 determines whether or not the face of the person is facing forward.

Here, since the state where the face is facing forward is a state where the person is paying attention to the information processing apparatus 1, this state is called "Attention." On the other hand, the state where the face is not facing forward is called "No attention" because the person is not paying attention to the information processing apparatus 1.

(Control of Screen Brightness by HPD Processing)

The information processing apparatus 1 controls the brightness of the display unit 110 based on whether or not a person is present in the detection range FoV or the orientation of a face of the person who exists. The brightness of the display unit 110 is the brightness of the screen of the display unit 110, which is called the "screen brightness" below. For example, when detecting a change from "Presence" to "Absence" by the HPD processing, or when detecting a change from "Attention" to "No attention" even in "Presence," the information processing apparatus 1 reduces the screen brightness to a certain percentage brightness value of the current brightness value.

Here, the current brightness value (a brightness value before the screen brightness is reduced) is, for example, a brightness value in the state of "Presence" and "Attention," which is initially set in the system, or a brightness value changed by the user from the initially set brightness value. Although the percentage of decreasing from the current brightness value can be set arbitrarily, the brightness value may be reduced, for example, to a brightness value of 0 to 20% of the initially set brightness value. As the screen brightness is reduced more, the effect of power saving increases. Further, since it is less likely to be seen by others, security is also improved.

For example, when "Absence" or "No attention" is detected by the HPD processing, the information processing apparatus 1 changes the screen brightness to a brightness value that is 20% of the current brightness value to reduce the screen brightness. Further, when changing the screen brightness from the current brightness value, the information processing apparatus 1 stores the brightness value (current brightness value) before change. Then, when a change from "Absence" to "Presence" or a change from "No attention" to "Attention" is detected by the HPD processing, the information processing apparatus 1 restores the brightness value to the stored brightness value before change. Processing to change the brightness value of the screen brightness by this HPD processing is called "HPD brightness changing processing" below.

(Control of Screen Brightness Using ALS)

Further, the information processing apparatus 1 adjusts the screen brightness according to the ambient brightness detected by using the ambient light sensor 130 (ALS). Processing to change the brightness value of the screen brightness based on the detection result using this ambient light sensor 130 is called "ALS brightness changing processing" below. For example, the information processing apparatus 1 increases or decreases the screen brightness from the current brightness value based on the detection result using the ambient light sensor 130. The increased or decreased amount of brightness value is preset according to the amount of change from the ambient brightness.

The information processing apparatus 1 has the above-described HPD brightness changing processing and ALS brightness changing processing as functions to adjust the screen brightness. Here, when the HPD brightness changing processing and the ALS brightness changing processing operate separately from each other to change the screen brightness, since neither the HPD brightness changing processing nor the ALS brightness changing processing understands each other's processing to change the screen brightness, the screen brightness may not be able to be controlled because of the discrepancy therebetween. Therefore, the information processing apparatus 1 according to the present embodiment controls whether or not to perform the ALS brightness changing processing based on the detection result of the HPD processing. Specifically, when the HPD brightness changing processing (to reduce the screen brightness) is in such a situation as to be performed based on the detection result of the HPD processing, the information processing apparatus 1 controls the ALS brightness changing processing not to be performed. Note that the situation in which the HPD brightness changing processing is performed is when the detection result of the HPD processing is "Absence" or "No attention." Thus, the screen brightness can be controlled properly.

FIGS. 4A-4B are explanatory diagrams of an example of screen brightness control according to the present embodiment. Referring to this diagram, how the screen brightness changes as the ambient brightness and the orientation of the face changes will be described. FIG. 4A illustrates screen brightness control on the assumption that both the HPD brightness changing processing and the ALS brightness changing processing are performed regardless of the detection result of the HPD processing as a comparison to describe the control of the present embodiment. On the other hand, FIG. 4B illustrates the screen brightness control of the present embodiment.

First, control in FIG. 4A as a comparison with the control of the present embodiment will be described. At starting point (1), it is assumed that the orientation of the face is forward inside a tunnel (in a state where the surroundings are dark), and a brightness value of the screen brightness at this time is "100." Note that the brightness values of the screen brightness illustrated in this diagram are illustrated to describe how the brightness values relatively change by the HPD brightness changing processing and the ALS brightness changing processing, which do not indicate actual brightness values.

At (2), it is assumed that the face turned to the side though the inside of the tunnel is not changed from (1). The information processing apparatus 1 detects a change from "Attention" to "No Attention" by the HPD processing to reduce the screen brightness from the current brightness value of "100" to a brightness value of "20" as a certain percentage (for example, "20%") by the HPD brightness changing processing. Further, when changing the screen brightness, the information processing apparatus 1 stores the brightness value "100" before change.

Next, at (3), it is assumed that it is outside the tunnel (in a state where the surroundings are bright) though the orientation of the face stays sideways like at (2). The information processing apparatus 1 increases the screen brightness from the current brightness value of "20" by a brightness value (for example, "+30") based on the detection result using the ambient light sensor 130 by the ALS brightness changing processing. Thus, the brightness value of the screen brightness becomes, for example, "50."

Next, at (4), it is assumed that the face turned to the front though the outside of the tunnel is not changed from (3). The information processing apparatus 1 detects a change from "No attention" to "Attention" by the HPD processing, and restores, by the HPD brightness changing processing, the screen brightness to the brightness value of "100" stored at (2).

Next, at (5), it is assumed that it is inside the tunnel (in the state where the surroundings are dark) though the orientation of the face stays forward like at (4). In other words, this state is the same state as the state where the orientation of the face is forward inside the tunnel at the starting point (1). The information processing apparatus 1 decreases the screen brightness by a brightness value (for example, "−30") from the current brightness value of "100" based on the detection result using the ambient light sensor 130 by the ALS brightness changing processing. Thus, the brightness value of the screen brightness becomes, for example, "70." In other words, since the screen brightness at (5) is the brightness value different from "100" of the screen brightness at (1) regardless of the same state as the state where the orientation of the face is forward inside the tunnel at (1), the screen brightness cannot be controlled properly because there is a discrepancy.

Subsequently, control of the screen brightness of the present embodiment illustrated in FIG. 4B will be described. Starting point (1) is the same as starting point (1) in FIG. 4A described above. At (2), when the orientation of the face turned to the side, since the information processing apparatus 1 detects the change from "Attention" to "No attention" by the HPD processing, the information processing apparatus 1 controls the ALS brightness changing processing not to be performed. For example, the information processing apparatus 1 holds and fixes the output value of the ambient light sensor 130 (ALS) (the output value inside the tunnel). Further, at (2), the information processing apparatus 1 reduces the screen brightness from the current brightness value of "100" to a brightness value of "20" as a certain percentage (for example, "20%") by the HPD brightness changing processing, and when changing the screen brightness, the information processing apparatus 1 stores the brightness value of "100" before change.

Next, at (3), since "No attention" is detected because the orientation of the face is sideways though it is outside the tunnel (in the state where the surroundings are bright), the information processing apparatus 1 continuously fixes the output value to the output value of the ambient light sensor 130 (ALS) (the output value inside the tunnel). Therefore, the information processing apparatus 1 does not perform the control of the screen brightness by the ALS brightness changing processing, and the brightness value of the screen brightness stays at "20."

Next, at (4), since the orientation of the face turned to the front though the outside of the tunnel is not changed from (3), the information processing apparatus 1 detects the change from "No attention" to "Attention" by the HPD processing, and restores the screen brightness to the brightness value of "100" stored at (2) by the HPD brightness changing processing. Further, since the information processing apparatus 1 detects the change to "Attention," the information processing apparatus 1 sets an output value according to the ambient brightness without fixing to the output value of the ambient light sensor 130 (ALS). Thus, the information processing apparatus 1 increases the screen brightness (for example, by "+30") based on the detection result using the ambient light sensor 130 by the ALS brightness changing processing. Thus, the brightness value of the screen brightness becomes, for example, "130."

Next, at (5), since it is inside the tunnel (in the state where the surroundings are dark) though the orientation of the face stays forward like at (4), the information processing apparatus 1 reduces the screen brightness (for example, by "−30") from the current brightness value of "130" based on the detection result using the ambient light sensor 130 by the ALS brightness changing processing. Thus, the brightness value of the screen brightness becomes, for example, "100." In other words, the screen brightness at (5) in the same state as the state where the orientation of the face is forward inside the tunnel at (1) becomes the same brightness value as the screen brightness of "100" at (1). Therefore, the screen brightness can be controlled properly without causing any discrepancy as described with reference to FIG. 4A.

The configurations of the information processing apparatus 1 according to the present embodiment will be described in detail below.

[Hardware Configuration of Information Processing Apparatus]

Figure 5:
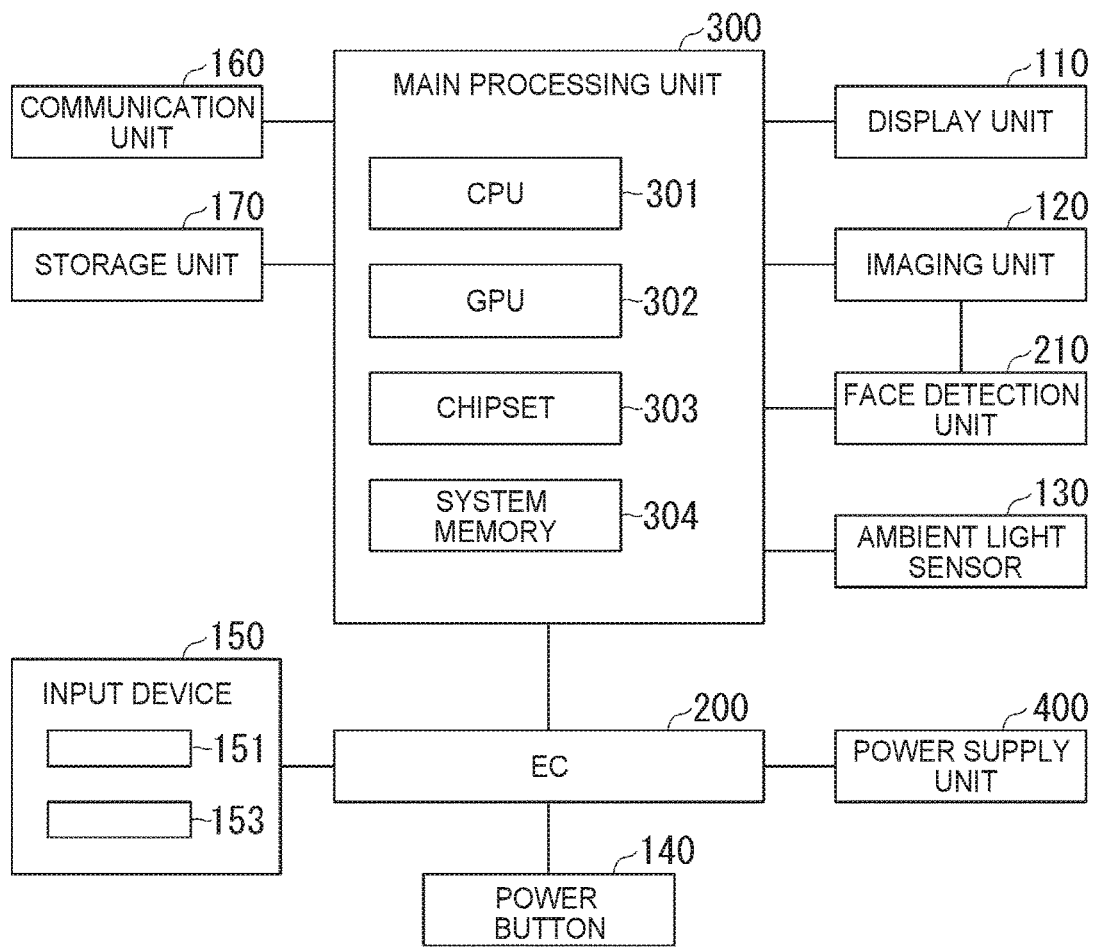
FIG. 5 is a schematic block diagram illustrating an example of the hardware configuration of the information processing apparatus according to the embodiment.

FIG. 5 is a schematic block diagram illustrating an example of the hardware configuration of the information processing apparatus 1 according to the present embodiment. In FIGS. 4A-4B, components corresponding to respective units in FIG. 1 are given the same reference numerals. The information processing apparatus 1 is configured to include the display unit 110, the imaging unit 120, the ambient light sensor 130, the power button 140, an input device 150, a communication unit 160, a storage unit 170, an EC (Embedded Controller) 200, a face detection unit 210, a main processing unit 300, and a power supply unit 400.

The display unit 110 displays display data (images) generated based on system processing executed by the main processing unit 300, processing of application programs running on the system processing, and the like.

The imaging unit 120 captures an image of an object within the predetermined imaging range (angle of view) in the direction (frontward) to face the inner face of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both of the visible light camera and the infrared camera.

The ambient light sensor 130 senses the ambient brightness (the amount of light) of the information processing apparatus 1, and outputs a voltage value according to the sensed brightness as the detection result.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of operation details.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM (Random Access Memory), a ROM (Read Only Memory), and a flash ROM. The storage unit 170 stores the OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor to execute HPD processing by face detection based on image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 to perform face detection processing for detecting a face area from the captured image, detecting the orientation of a face of a face image included in the detected face area, and the like. As the face detection method, any detection method using a face detection algorithm for detecting a face based on facial feature information, trained data (learned model) subjected to machine learning based on the facial feature information, a face detection library, or the like can be applied.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 is a processor to execute processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires the detection result of the ambient brightness by the ambient light sensor 130 and the detection result of the HPD processing by the face detection unit 210, and transmits the detection results to the CPU 301. Further, the chipset 303 executes the ALS brightness changing processing and the HPD brightness changing processing using the detection result of the ambient brightness by the ambient light sensor 130 and the detection result of the HPD processing by the face detection unit 210. For example, the chipset 303 executes the ALS brightness changing processing and the HPD brightness changing processing described with reference to FIG. 4B. Further, the chipset 303 outputs the acquired various detection results and various processing results to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may also be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

[Functional Configuration of Information Processing Apparatus]

Next, the functional configuration of the information processing apparatus 1 to perform the HPD brightness changing processing and the ALS brightness changing processing will be described in detail.

Figure 6:
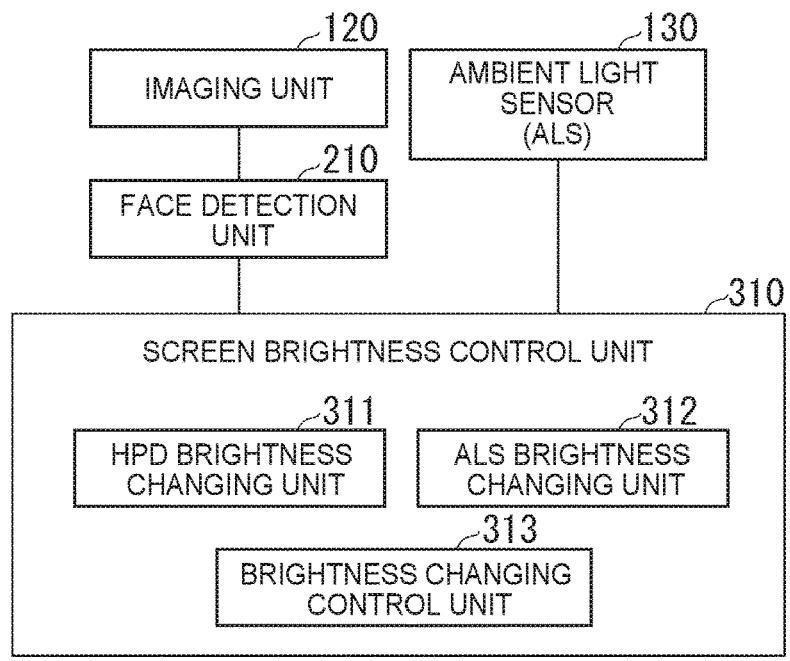
FIG. 6 is a schematic block diagram illustrating an example of the functional configuration of the information processing apparatus according to the embodiment.

FIG. 6 is a schematic block diagram illustrating an example of the functional configuration of the information processing apparatus 1 according to the present embodiment. The information processing apparatus 1 includes the imaging unit 120, the ambient light sensor 130, the face detection unit 210, and a screen brightness control unit 310. The imaging unit 120, the ambient light sensor 130, and the face detection unit 210 correspond respectively to the imaging unit 120, the ambient light sensor 130, and the face detection unit 210 illustrated in FIG. 5.

The face detection unit 210 uses the imaging unit 120 to execute HPD processing for detecting a person present in front of the information processing apparatus 1 (within the detection range FoV) or the orientation of a face of the person. Specifically, the face detection unit 210 processes image data of a captured image acquired from the imaging unit 120 to detect a face area with a face captured therein from the captured image. When the face area is detected from the captured image, the face detection unit 210 outputs "Presence" information indicating that a person is present in front of the information processing apparatus 1. On the other hand, when no face area is detected from the captured image, the face detection unit 210 outputs "Absence" information indicating that no person is present in front of the information processing apparatus 1.

Further, when the face area is detected from the captured image, the face detection unit 210 detects the orientation of a face in a face image included in the detected face area. For example, the face detection unit 210 detects an orientation corresponding to a rotation angle of the face in the left and right direction and an orientation corresponding to a rotation angle of the face in the up and down direction to determine whether or not the face is facing forward. When determining that the face is facing forward, the face detection unit 210 outputs "Attention" information indicative of a state where the person is paying attention to the information processing apparatus 1. On the other hand, when determining that the face is not facing forward, the face detection unit 210 outputs "No attention" information indicative of a state where the person is not paying attention to the information processing apparatus 1.

The screen brightness control unit 310 changes the brightness value of the screen brightness by the HPD brightness changing processing and the ALS brightness changing processing. The brightness value of the screen brightness before being changed by the HPD brightness changing processing and the ALS brightness changing processing is a brightness value initially set in the system, and the brightness value can also be changed by the user from the initially set value depending on the usage environment and preference of the user. The brightness value of the screen brightness is stored, for example, in the storage unit 170. In the HPD brightness changing processing and the ALS brightness changing processing, the screen brightness control unit 310 changes the brightness value from the current brightness value stored in the storage unit 170. The screen brightness control unit 310 includes an HPD brightness changing unit 311, an ALS brightness changing unit 312, and a brightness changing control unit 313 as functional components executed, for example, by the chipset 303 (for example, by the sensor hub).

The HPD brightness changing unit 311 executes HPD brightness changing processing to change the screen brightness of the display unit 110 from the current brightness value based on the detection result of the HPD processing by the face detection unit 210 using the imaging unit 120. For example, when acquiring the "Absence" information or the "No attention" information from the face detection unit 210, the HPD brightness changing unit 311 reduces the screen brightness from the current brightness value to a brightness value with a certain percentage (for example, "20%") reduced. In other words, the HPD brightness changing unit 311 changes the screen brightness from the current brightness value as a result of detecting that no person is present in the detection range FoV or that a person present in the detection range FoV is not facing the direction of the display unit 110 based on the detection result of the HPD processing. Further, the HPD brightness changing unit 311 stores, for example, in the storage unit 170, the brightness value before change.

Further, when acquiring the "Presence" information or the "Attention" information from the face detection unit 210, the HPD brightness changing unit 311 restores the screen brightness to the brightness value before change stored in the storage unit 170. In other words, the HPD brightness changing unit 311 restores the screen brightness to the brightness value before change stored in the storage unit 170 as a result of detecting that a person is present from a state where no person is present in the detection range FoV or that a face of the person turned in the direction of the display unit 110 from the state of not being facing the direction of the display unit 110 based on the detection result of the HPD processing.

The ALS brightness changing unit 312 executes the ALS brightness changing processing to change the screen brightness of the display unit 110 from the current brightness value based on the detection result of the ambient brightness using the ambient light sensor 130. For example, the ALS brightness changing unit 312 increases or decreases the screen brightness from the current brightness value based on the output value output from the ambient light sensor 130 depending on the ambient brightness. The amount of change to increase or decrease the brightness value is the amount of change depending on the change in ambient brightness. The ALS brightness changing unit 312 increases the brightness value of the screen brightness as the surroundings are brighter, or decreases the brightness value of the screen brightness as the surroundings are darker.

Based on the detection result of the HPD processing by the face detection unit 210 using the imaging unit 120, the brightness changing control unit 313 controls whether or not to change the screen brightness by the ALS brightness changing processing. For example, when detecting that no person is present in the detection range FoV or that the face of the person present in the detection range FoV is not facing the direction of the display unit 110 based on the detection result of the HPD processing, the brightness changing control unit 313 performs control not to change the screen brightness by the ALS brightness changing processing.

Specifically, when acquiring the "Absence" information or the "No attention" information from the face detection unit 210, the brightness changing control unit 313 holds and fixes the output value of the ambient light sensor 130 so as not to change the screen brightness by the ALS brightness changing processing. As an example, the brightness changing control unit 313 fixes the output value of the ambient light sensor 130 to an output value at the time when the "Absence" information or "No attention" information was acquired. Note that, when fixing the output value of the ambient light sensor 130, for example, the brightness changing control unit 313 may latch the output value of the ambient light sensor 130 and inform the ALS brightness changing unit 312 thereof, or may instruct the ambient light sensor 130 to hold and fix the output. Thus, the screen brightness is not changed even when the ambient brightness changes.

Further, when acquiring the "Presence" information or the "Attention" information from the face detection unit 210, the brightness changing control unit 313 releases the fixed output value of the ambient light sensor 130. Thus, the output value of the ambient light sensor 130 becomes an output value according to the ambient brightness to increase or decrease the screen brightness depending on a change in ambient brightness.

Note that, in a state of not supporting the HPD processing (in a state of not executing the HPD processing), the brightness changing control unit 313 sets an output value according to the ambient brightness without fixing the output value of the ambient light sensor 130. The state of not supporting the HPD processing is, for example, a state where the function of the HPD processing is disabled because there is a possibility that face detection cannot be performed properly such as a state where the first chassis 10 and the second chassis 20 are open at a predetermined open angle θ or more (for example, 1300 or more), or a state of being held in hand. Further, the state of not supporting the HPD processing may be a state where the function of the HPD processing is set to disabled by the user.

Note that, in a state where at least either one of the HPD brightness changing processing and the ALS brightness changing processing is not executed (a state of being disabled), the brightness changing control unit 313 sets an output value according to the ambient brightness without fixing the output value of the ambient light sensor 130 in the above brightness changing control processing. In other words, in the state where the HPD brightness changing processing is disabled, since the ALS brightness changing processing is executed so that there will be no discrepancy in the screen brightness, there is no situation to fix the output value of the ambient light sensor 130. Further, even in the state where the ALS brightness changing processing is disabled, since the HPD brightness changing processing is executed so that there will be no discrepancy in the screen brightness, there is no situation to fix the output value of the ambient light sensor 130. Note that it is assumed that the ambient light sensor 130 is used in processing other than the ALS brightness changing processing to enable the output value of the ambient light sensor 130 without fixing the output value of the ambient light sensor 130 even in the state where the ALS brightness changing processing is disabled.

[Operation of Processing]

Figure 7:
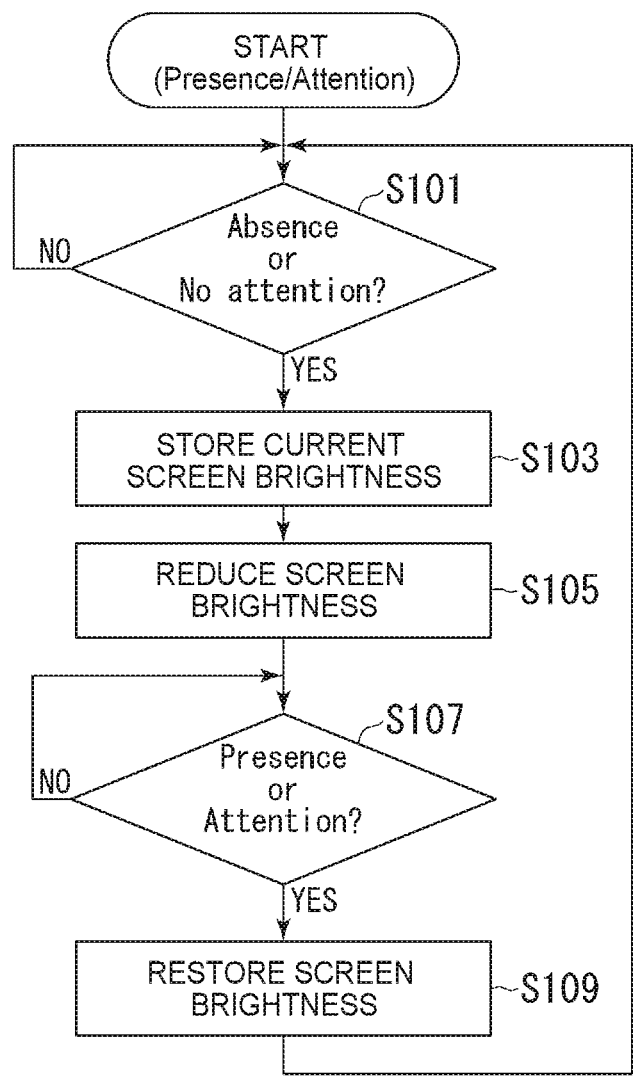
FIG. 7 is a flowchart illustrating an example of HPD brightness changing processing according to the embodiment.

Next, the operation of processing in which the screen brightness control unit 310 changes the screen brightness will be described. Referring first to FIG. 7, the operation of the HPD brightness changing processing will be described.

FIG. 7 is a flowchart illustrating an example of the HPD brightness changing processing according to the present embodiment. Here, it is assumed that the information processing apparatus 1 is in the state of "Presence" and "Attention" in the normal operating state.

(Step S101) The screen brightness control unit 310 determines whether or not to acquire the "Absence" information or the "No attention" information from the face detection unit 210. When determining that the "Absence" information or the "No attention" information is acquired from the face detection unit 210 (YES), the screen brightness control unit 310 proceeds to a process in step S103. On the other hand, when determining that the "Absence" information or the "No attention" information is not acquired from the face detection unit 210 (NO), the screen brightness control unit 310 performs the process in step S101 again.

(Step S103) The screen brightness control unit 310 stores the brightness value of the current screen brightness in the storage unit 170. In other words, the screen brightness control unit 310 stores, in the storage unit 170, the screen brightness value before changing the screen brightness. Then, the screen brightness control unit 310 proceeds to a process in step S105.

(Step S105) The screen brightness control unit 310 changes the screen brightness from the current brightness value. For example, the screen brightness control unit 310 reduces the brightness value to a brightness value as a certain percentage (for example, "20%") of the current brightness value. Then, the screen brightness control unit 310 proceeds to a process in step S107.

(Step S107) The screen brightness control unit 310 determines whether or not to acquire the "Presence" information or the "Attention" information from the face detection unit 210. When determining that neither the "Presence" information nor the "Attention" information is acquired from the face detection unit 210 (NO), the screen brightness control unit 310 performs the process in step S107 again due to no restoration trigger. On the other hand, when determining that the "Presence" information or the "Attention" information is acquired from the face detection unit 210 (YES), the screen brightness control unit 310 proceeds to a process in step S109 because there is a restoration trigger.

(Step S109) The screen brightness control unit 310 restores the brightness value of the screen brightness to the brightness value (the brightness value before change) stored in step S103. Then, the screen brightness control unit 310 returns to the process in step S101.

Figure 8:
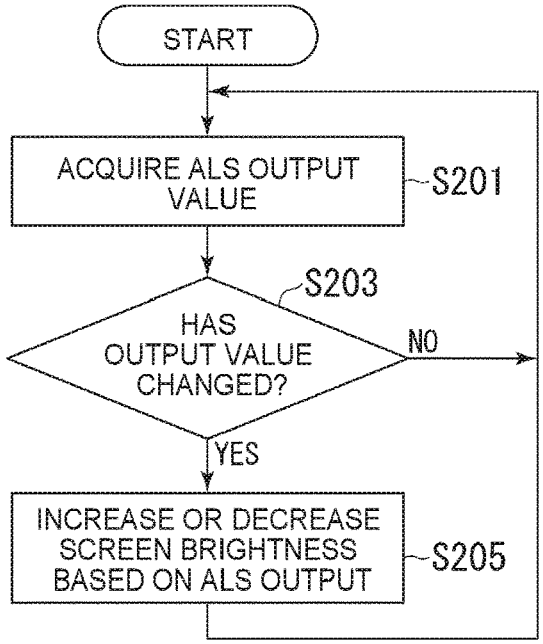
FIG. 8 is a flowchart illustrating an example of ALS brightness changing processing according to the embodiment.

Referring next to FIG. 8, the operation of the ALS brightness changing processing will be described.

FIG. 8 is a flowchart illustrating an example of the ALS brightness changing processing according to the present embodiment.

(Step S201) The screen brightness control unit 310 acquires an output value output from the ambient light sensor 130 according to the ambient brightness. For example, the screen brightness control unit 310 acquires the output value of the ambient light sensor 130 on a predetermined periodic basis (for example, every one second). Then, the screen brightness control unit 310 proceeds to a process in step S203.

(Step S203) Each time the screen brightness control unit 310 acquires the output value of the ambient light sensor 130 in step S201, the screen brightness control unit 310 compares the output value acquired this time with the output value acquired last time to determine whether or not the output value has changed. When determining that the output value has changed by a certain value or more (YES), the screen brightness control unit 310 proceeds to a process in step S205. On the other hand, when determining that the output value has not changed by the certain value or more (NO), the screen brightness control unit 310 returns to the process in step S201.

(Step S205) Based on the output value of the ambient light sensor 130 acquired in step S203, the screen brightness control unit 310 changes the screen brightness from the current brightness value. For example, the screen brightness control unit 310 increases or decreases the screen brightness from the current brightness value depending on the amount of change in the output value of the ambient light sensor 130 (that is, the amount of change in ambient brightness). Specifically, when the surroundings have changed to be brighter, the screen brightness control unit 310 increases the screen brightness from the current brightness value, while when the surroundings have changed to be darker, the screen brightness control unit 310 decreases the screen brightness from the current brightness value. Then, the screen brightness control unit 310 returns to the process in step S201.

Figure 9:
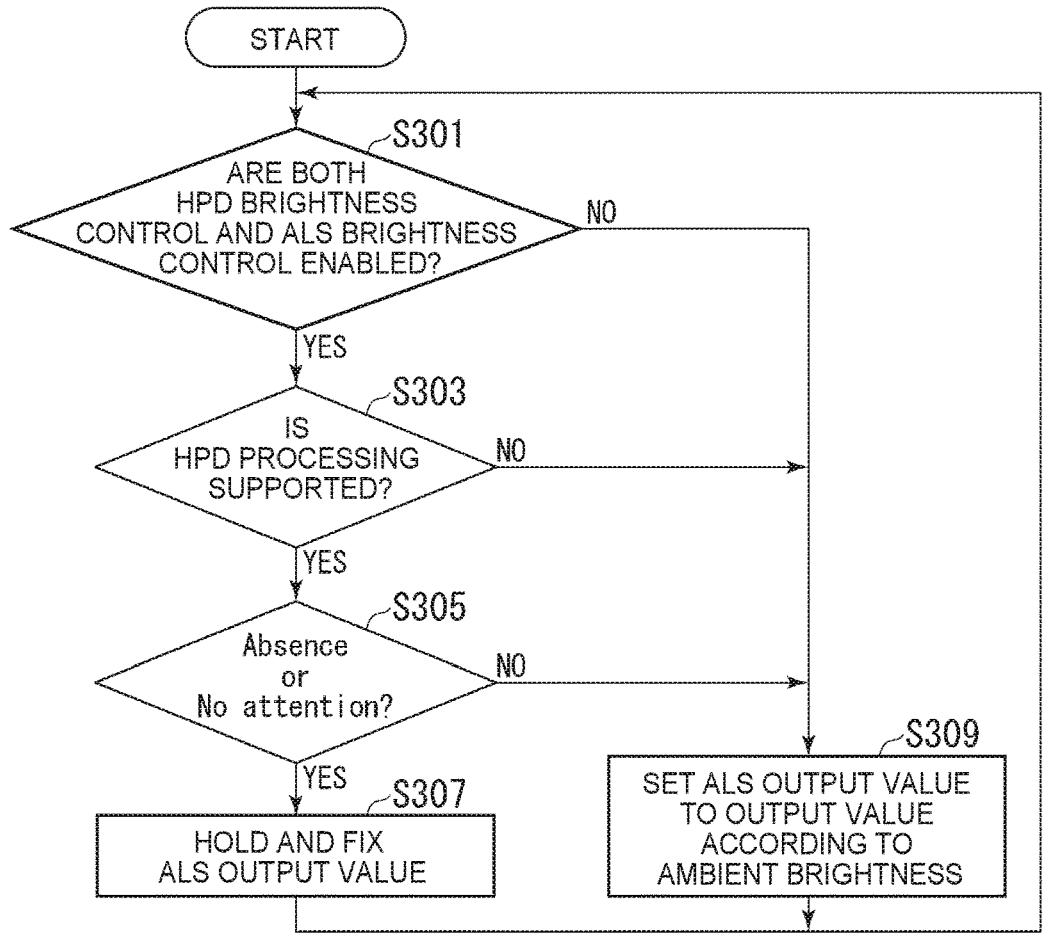
FIG. 9 is a flowchart illustrating an example of screen brightness changing control processing according to the embodiment.

Referring next to FIG. 9, the operation of screen brightness changing control processing to control whether or not to change the screen brightness by the ALS brightness changing unit 312 based on the detection result by the HPD processing will be described. FIG. 9 is a flowchart illustrating an example of the screen brightness changing control processing according to the present embodiment.

(Step S301) The screen brightness control unit 310 determines whether or not both the HPD brightness changing processing and the ALS brightness changing processing are enabled. When determining that both the HPD brightness changing processing and the ALS brightness changing processing are enabled (YES), the screen brightness control unit 310 proceeds to a process in step S303. On the other hand, when determining that at least either one of the HPD brightness changing processing and the ALS brightness changing processing is disabled (NO), the screen brightness control unit 310 proceeds to a process in step S309.

(Step S303) The screen brightness control unit 310 determines whether or not the HPD processing is supported. When determining that the HPD processing is supported (YES), the screen brightness control unit 310 proceeds to a process in step S305. On the other hand, when determining that the HPD processing is not supported (NO), the screen brightness control unit 310 proceeds to the process in step S309.

(Step S305) The screen brightness control unit 310 determines whether or not the "Absence" information or the "No attention" information is acquired from the face detection unit 210. When determining that the "Absence" information or the "No attention" information is acquired from the face detection unit 210 (YES), the screen brightness control unit 310 proceeds to a process in step S307. On the other hand, when neither the Absence" information nor the "No attention" information is acquired (NO), the screen brightness control unit 310 proceeds to the process in step S309.

(Step S307) The screen brightness control unit 310 holds and fixes the output value of the ambient light sensor 130 not to change the screen brightness by the ALS brightness changing processing. Then, the screen brightness control unit 310 returns to the process in step S301.

(Step S309) The screen brightness control unit 310 sets the output value of the ambient light sensor 130 to an output value according to the ambient brightness. Then, the screen brightness control unit 310 returns to the process in step S301.

Summary of Embodiment

As described above, the information processing apparatus 1 according to the present embodiment includes: a memory (for example, the system memory 304) which temporarily stores programs of a system (for example, BIOS, OS, and the like) and programs executed on the system (for example, programs such as applications, drivers, services, and the like); a processor (for example, the CPU 301, the GPU 302, the chipset 303, or the like) which executes processing based on the programs stored in the memory; the display unit 110 which displays a display image based on the processing executed by the processor; the imaging unit 120 (an example of a first sensor) for detecting a person present in the detection range FoV (an example of a predetermined detection range) or the orientation of a face of the person; and the ambient light sensor 130 (an example of a second sensor) for detecting the ambient brightness. For example, the information processing apparatus 1 performs the HPD brightness changing processing (an example of first brightness changing processing) to change the screen brightness of the display unit 110 from a current brightness value based on the detection result using the imaging unit 120, and the ALS brightness changing processing (an example of second brightness changing processing) to change the screen brightness of the display unit 110 from the current brightness value based on the detection result using the ambient light sensor 130. Further, the information processing apparatus 1 performs the brightness changing control processing to control whether or not to change the screen brightness by the ALS brightness changing processing based on the detection result (for example, the detection result of the HPD processing) using the imaging unit 120.

Thus, since the information processing apparatus 1 controls whether or not to change the screen brightness by the ALS brightness changing processing by taking into consideration a situation to change the screen brightness by the HPD brightness changing processing, the screen brightness of the display unit 110 can be controlled properly without causing any discrepancy in the recognition of the screen brightness between the HPD brightness changing processing and the ALS brightness changing processing.

For example, when it is detected that no person is present in the detection range FoV or that a face of a person present in the detection range FoV is not facing a direction of the display unit 110 based on the detection result (for example, the detection result of the HPD processing) using the imaging unit 120, the information processing apparatus 1 performs control not to change the screen brightness by the ALS brightness changing processing in the brightness changing control processing.

Thus, since the information processing apparatus 1 does not change the screen brightness by the ALS brightness changing processing while the screen brightness is being changed (reduced) by the HPD brightness changing processing, any discrepancy in the recognition of the screen brightness is not caused between the HPD brightness changing processing and the ALS brightness changing processing. Therefore, the information processing apparatus 1 can control the screen brightness of the display unit 110 properly.

As an example, in the ALS brightness changing processing, the information processing apparatus 1 changes the screen brightness from the current brightness value based on an output value output from the ambient light sensor 130 according to the ambient brightness. Then, in the brightness changing control processing, when performing control not to change the screen brightness by the ALS brightness changing processing, the information processing apparatus 1 fixes the output value of the ambient light sensor 130.

Thus, since the output value of the ambient light sensor 130 is fixed, the information processing apparatus 1 can perform control not to change the screen brightness even when the ambient brightness changes.

Note that, in a state where the HPD processing using the imaging unit 120 to detect whether or not a person is present in the detection range FoV or to detect the orientation of a face of the person present in the detection range FoV is not executed (that is, in a state where the HPD processing is not supported), the information processing apparatus 1 sets an output value according to the ambient brightness without fixing the output value of the ambient light sensor 130 in the brightness changing control processing.

Thus, when the HPD processing is not supported, the information processing apparatus 1 can control the screen brightness of the display unit 110 properly depending on the ambient brightness by the ALS brightness changing processing.

Further, in a state where at least either one of the HPD brightness changing processing and the ALS brightness changing processing is not executed (is disabled), the information processing apparatus 1 sets an output value according to the ambient brightness without fixing the output value of the ambient light sensor 130 in the brightness changing control processing.

Thus, in a state where only the ALS brightness changing processing is executed between the HPD brightness changing processing and the ALS brightness changing processing, the information processing apparatus 1 can control the screen brightness of the display unit 110 depending on the ambient brightness by the ALS brightness changing processing. Further, in a state where only the HPD brightness changing processing is executed between the HPD brightness changing processing and the ALS brightness changing processing, the information processing apparatus 1 can perform processing using the ambient light sensor 130 properly in processing other than the ALS brightness changing processing.

Further, when changing the screen brightness from the current brightness value in the ALS brightness changing processing, the information processing apparatus 1 increases or decreases the screen brightness from the current brightness value based on the detection result using the ambient light sensor 130.

Thus, the information processing apparatus 1 can increase or decrease the screen brightness of the display unit 110 properly depending on the ambient brightness.

Further, in the HPD brightness changing processing, the information processing apparatus 1 changes the screen brightness from the current brightness value and stores, in the storage unit 170, the brightness value before change as a result of detecting that no person is present in the detection range FoV or that a face of a person present in the detection range FoV is not facing the direction of the display unit 110 based on the detection result (for example, the detection result of the HPD processing) using the imaging unit 120. Then, the information processing apparatus 1 restores the screen brightness to the brightness value before change stored in the storage unit 170 as a result of detecting that a person is present from the state where no person is present in the detection range FoV or that a face of the person not facing the direction of the display unit 110 turned in the direction of the display unit 110 based on the detection result (for example, the detection result of the HPD processing) using the imaging unit 120.

Thus, the information processing apparatus 1 can restore the screen brightness to the original screen brightness before change after reducing the screen brightness by the HPD brightness changing processing.

Further, a control method for the information processing apparatus 1 according to the present embodiment includes: a first brightness changing step of causing the processor (for example, the chipset 303) to change the screen brightness of the display unit 110 from the current brightness value based on the detection result using the imaging unit 120; a second brightness changing step of causing the processor to change the screen brightness of the display unit 110 from the current brightness value based on the detection result using the ambient light sensor 130; and a brightness changing control step of causing the processor to control whether or not to change the screen brightness by the above second brightness changing step based on the detection result (for example, the detection result of the HPD processing) using the imaging unit 120.

Thus, since the information processing apparatus 1 controls whether or not to change the screen brightness by the ALS brightness changing processing by taking into consideration a situation to change the screen brightness by the HPD brightness changing processing, the screen brightness of the display unit 110 can be controlled properly without causing any discrepancy in the recognition of the screen brightness between the HPD brightness changing processing and the ALS brightness changing processing.

While the embodiment of this invention has been described in detail above with reference to the accompanying drawings, the specific configurations are not limited to those in the embodiment described above, and design changes are also included without departing from the scope of this invention. For example, the respective components described in the above embodiment can be combined arbitrarily.

Further, in the aforementioned embodiment, the configuration to detect a face area and the orientation of a face from a captured image captured by the imaging unit 120 is described, but the detection of the orientation of the face may not be performed. For example, the configuration may also be such that the presence or absence of a person (user) in front of the information processing apparatus 1 is detected by detecting the face area from the captured image to control the screen brightness and the operating state of the system.

Further, in the aforementioned embodiment, the example in which the HPD processing is performed to detect a person (user) present in front of the information processing apparatus 1 using the imaging unit 120 by detecting a face area from the captured image captured by the imaging unit 120 is described, but a ranging sensor such as a ToF sensor may also be used together in addition to the imaging unit 120 or the ranging sensor may be used without using the imaging unit 120 to perform the HPD processing.

Further, the configuration example in which the imaging unit 120 is built in the information processing apparatus 1 is described, but the present invention is not limited to this example. For example, the imaging unit 120 does not have to be built in the information processing apparatus 1, which may also be attachable to the information processing apparatus 1 (for example, onto any one of the side faces 10a, 10b, 10c, and the like) and communicably connected to the information processing apparatus 1 wirelessly or by wire as an external accessory of the information processing apparatus 1.

Further, in the aforementioned embodiment, the example in which the face detection unit 210 is provided separately from the CPU 301 and the chipset 303, but some or all of the functions of the face detection unit 210 may be provided in the chipset 303, or may be provided in a processor integrated with the CPU 301 or the chipset 303. For example, the CPU 301, the chipset 303, and the face detection unit 210 may be configured as individual processors, or configured to be integrated as one processor. Further, some or all of the functions of the face detection unit 210 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line.

Further, the "computer-readable recording medium" means a storage medium such as a flexible disk, a magneto-optical disk, a portable medium like a flash ROM or a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the embodiment described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the embodiment mentioned above is not limited to the laptop PC, which may be, for example, a desktop PC or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 information processing apparatus
10 first chassis
20 second chassis
15 hinge mechanism
110 display unit
120 imaging unit
130 ambient light sensor
140 power button
150 input device
151 keyboard
153 touch pad
160 communication unit
170 storage unit
200 EC
210 face detection unit
300 main processing unit
301 CPU
302 GPU
303 chipset
304 system memory
310 screen brightness control unit
311 HPD brightness changing unit
312 ALS brightness changing unit
313 brightness changing control unit
400 power supply unit

What is claimed is:

1. An information processing apparatus comprising:
   a memory which temporarily stores programs of a system and programs executed on the system;
   a processor which executes processing based on the programs stored in the memory;
   a display unit which displays a display image based on the processing executed by the processor;
   an imaging unit which detects a person present in a predetermined detection range or an orientation of a face of the person; and
   an ambient light sensor which detects an ambient brightness,
   wherein the processor performs:
      first brightness changing processing to change a screen brightness of the display unit from a current brightness value based on a detection result using the imaging unit,
      second brightness changing processing to change the screen brightness from the current brightness value based on an output value output from the ambient light sensor depending on the ambient brightness, and
      brightness changing control processing to control whether or not to change the screen brightness by the second brightness changing processing based on the detection result using the imaging unit,
   wherein, in response to the imaging unit detecting that no person is present in the predetermined detection range or that the face of the person is not facing a direction of the display unit, the processor holds and fixes the output value of the ambient light sensor, regardless of the ambient brightness, until the imaging unit detects that the person is present in the predetermined detection range or that the face of the person is facing the direction of the display unit, and
   wherein the second brightness changing processing maintains the same screen brightness while the output value of the ambient light sensor is held and fixed by the processor.

2. The information processing apparatus according to claim 1, wherein in a state where the processing using the imaging unit to detect whether or not a person is present in the predetermined detection range or to detect the orientation of a face of the person present in the predetermined detection range is not executed, the processor sets an output value according to the ambient brightness without fixing the output value of the ambient light sensor in the brightness changing control processing.

3. The information processing apparatus according to claim 1, wherein in a state where at least either one of the first brightness changing processing and the second brightness changing processing is not executed, the processor sets an output value according to the ambient brightness without fixing the output value of the ambient light sensor in the brightness changing control processing.

4. The information processing apparatus according to claim 1, when changing the screen brightness from the current brightness value in the second brightness changing processing, the processor increases or decreases the screen brightness from the current brightness value based on the detection result using the ambient light sensor.

5. The information processing apparatus according to claim 1, wherein
in the first brightness changing processing, the processor changes the screen brightness from the current brightness value and stores, in the storage unit, the brightness value before change as a result of detecting that no person is present in the predetermined detection range or that a face of a person present in the predetermined detection range is not facing the direction of the display unit based on the detection result using the imaging unit, and
the processor restores the screen brightness to the brightness value before change stored in the storage unit as a result of detecting that a person is present from a state where no person is present in the predetermined detection range or that a face of a person not facing the direction of the display unit turned in the direction of the display unit based on the detection result using the imaging unit.

6. A control method for an information processing apparatus including: a memory which temporarily stores programs of a system and programs executed on the system; a processor which executes processing based on the programs stored in the memory; a display unit which displays a display image based on the processing executed by the processor; an imaging unit which detects a person present in a predetermined detection range or an orientation of a face of the person; and an ambient light sensor which detects an ambient brightness, the control method comprising:
a first brightness changing step of causing the processor to change a screen brightness of the display unit from a current brightness value based on a detection result using the imaging unit;
a second brightness changing step of causing the processor to change the screen brightness from the current brightness value based on an output value output from the ambient light sensor depending on the ambient brightness; and
a brightness changing control step of causing the processor to control whether or not to change the screen brightness by the second brightness changing step based on the detection result using the imaging unit,
wherein, in response to the imaging unit detecting that no person is present in the predetermined detection range or that the face of the person is not facing a direction of the display unit, the processor holds and fixes the output value of the ambient light sensor, regardless of the ambient brightness, until the imaging unit detects that the person is present in the predetermined detection range or that the face of the person is facing the direction of the display unit, and
wherein the second brightness changing processing maintains the same screen brightness while the output value of the ambient light sensor is held and fixed by the processor.

* * * * *